United States Patent
Suzuki et al.

(10) Patent No.: US 8,134,800 B2
(45) Date of Patent: Mar. 13, 2012

(54) STOP POSITION ADJUSTING DEVICE AND STOP POSITION ADJUSTING METHOD FOR ACCESSOR MECHANISM

(75) Inventors: Takeshi Suzuki, Tokyo (JP); Shinichi Iwata, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 421 days.

(21) Appl. No.: 12/399,408

(22) Filed: Mar. 6, 2009

(65) Prior Publication Data

US 2009/0231753 A1   Sep. 17, 2009

(30) Foreign Application Priority Data

Mar. 12, 2008 (JP) .................................. 2008-062272

(51) Int. Cl.
*G11B 15/68* (2006.01)
(52) U.S. Cl. ....................................... 360/92.1; 700/245
(58) Field of Classification Search .................. 360/92.1; 700/245
See application file for complete search history.

(56) References Cited

U.S. PATENT DOCUMENTS

| | | | | |
|---|---|---|---|---|
| 5,426,581 A | * | 6/1995 | Kishi et al. | 700/64 |
| 5,532,931 A | * | 7/1996 | Erickson et al. | 700/218 |
| 5,959,425 A | * | 9/1999 | Bieman et al. | 318/568.15 |
| 6,101,455 A | * | 8/2000 | Davis | 702/94 |
| 6,552,866 B1 | * | 4/2003 | Lechner | 360/69 |
| 6,574,529 B1 | * | 6/2003 | Lundeen et al. | 700/218 |
| 7,117,068 B2 | * | 10/2006 | Critchlow | 700/245 |
| 2005/0016818 A1 | * | 1/2005 | Ito et al. | 198/345.1 |
| 2005/0080512 A1 | * | 4/2005 | Critchlow | 700/245 |

FOREIGN PATENT DOCUMENTS

| | | |
|---|---|---|
| DE | 10 2005 002 994 A1 | 8/2005 |
| EP | 1519372 A2 | 3/2005 |
| JP | 3-55184 U | 5/1991 |
| JP | 2001158507 A | 6/2001 |
| JP | 2005108414 A | 4/2005 |
| JP | 2005209280 A | 8/2005 |

OTHER PUBLICATIONS

German Office Action for DE 10 2009 012 881.6 issued Jul. 26, 2011.
Japanese Office Action for JP2008-062272 issued Dec. 27, 2011.

* cited by examiner

*Primary Examiner* — Hoai V Ho
*Assistant Examiner* — Jay Radke

(57) ABSTRACT

A stop position adjusting device for an accessor mechanism in an information recording device using a recording cartridge, includes: the accessor mechanism; a first moving mechanism; a second moving mechanism; and an image taking section. The accessor mechanism inserts the recording cartridge into a cell and takes out the recording cartridge from the cell. The first moving mechanism moves the accessor mechanism in a first direction. The second moving mechanism moves the accessor mechanism in a second direction different from the first direction. The image taking section is provided on the accessor mechanism and detects a position of a mark provided near the cell. An adjustment of a stop position of the accessor mechanism for the cell is executed based on the position detected by the image taking section.

6 Claims, 5 Drawing Sheets

STOP POSITION ADJUSTING DEVICE AND STOP POSITION ADJUSTING METHOD FOR ACCESSOR MECHANISM

INCORPORATION BY REFERENCE

This application is based upon and claims the benefit of priority from Japanese patent application No. 2008-062272 filed on Mar. 12, 2008, the disclosure of which is incorporated herein in its entirety by reference.

TECHNICAL FIELD

The present invention relates to a stop position adjusting device and a stop position adjusting method for an accessor mechanism in a magnetic tape unit.

BACKGROUND ART

As a backup unit for a computer, an information recording unit able to store large-size programs and large-size data with high reliability has been developed. A magnetic tape unit is one of such units and has advantages in reliability, a storage capacity, and costs.

The magnetic tape unit mounts a magazine, and the magazine includes a plurality of cells arranged lengthwise and crosswise in a matrix form. Each of the cells houses a magnetic tape cartridge (hereinafter referred to as "cartridge"). An accessor mechanism takes out a cartridge needed at required timing from a cell housing the cartridge, and transports it to a tape drive. After completion of recording or reproducing operation at the tape drive, the accessor mechanism transports the cartridge from the tape drive to the cell from which the cartridge was taken out and inserts it into the cell.

The accessor mechanism mounting the cartridge is required to be stopped accurately in front of the cell to normally complete taking out or inserting the cartridge from or into the cell. For this reason, a drive unit for controlling a stop position of the accessor mechanism is required to preliminarily obtain coordinates of the cell, and adjust and determine the stop position of the accessor mechanism on the basis of the coordinates of the cell.

Japanese Laid-Open Patent Application JP-P2005-209280A (corresponding to US2005163022A1 and DE102005002994A1) discloses a method of adjusting the stop position of the accessor mechanism with respect to the respective cells. This method provides a positioning hole to the magazine, detects a position of the hole by using a cartridge sensor shaft included in the accessor mechanism, calculates a relative position between the position of the hole and each cell, and adjusts the stop position of the accessor mechanism.

However, we have now discovered following facts. In the adjusting method described in JP-P2005-209280A, since the positioning hole has to be provided to the magazine, a space used for making the positioning hole should be provided in the magazine. As the result, there is a problem that prevents a whole structure of the magnetic tape unit from being compact.

In addition, in the adjusting method described in JP-P2005-209280A, since a positioning adjustment is carried out by inserting the cartridge sensor shaft many times into the positioning hole, there is a problem that the adjustment requires very long time.

SUMMARY

An exemplary object of the present invention is to provide a stop position adjusting device and a stop position adjusting method for an accessor mechanism, wherein a mechanism which adjusts a stop position of the accessor mechanism does not prevent a structure of the magnetic tape unit from being compact and the stop position of the accessor mechanism can be adjusted in a short time.

According to an exemplary aspect of the present invention, a stop position adjusting device for an accessor mechanism in an information recording device using a recording cartridge, includes: the accessor mechanism configured to insert the recording cartridge into a cell and take out the recording cartridge from the cell; a first moving mechanism configured to move the accessor mechanism in a first direction; a second moving mechanism configured to move the accessor mechanism in a second direction different from the first direction; and an image taking section configured to be provided on the accessor mechanism and detect a position of a mark provided near the cell. An adjustment of a stop position of the accessor mechanism for the cell is executed based on the position detected by the image taking section.

According to another exemplary aspect of the present invention, an information recording device using a recording cartridge, includes: a magazine configured to include a cell storing the recording cartridge; and a stop position adjusting device for an accessor mechanism. The stop position adjusting device includes: the accessor mechanism configured to insert the recording cartridge into the cell and take out the recording cartridge from the cell, a first moving mechanism configured to move the accessor mechanism in a first direction, a second moving mechanism configured to move the accessor mechanism in a second direction different from the first direction, and an image taking section configured to be provided on the accessor mechanism and detect a position of a mark provided near the cell. An adjustment of a stop position of the accessor mechanism for the cell is executed based on the position detected by the image taking section.

According to another exemplary aspect of the present invention, a stop position adjusting method executed by a stop position adjusting device for an accessor mechanism in an information recording device using a recording cartridge, includes following functions. Here, the stop position adjusting device includes: the accessor mechanism configured to insert the recording cartridge into a cell and take out the recording cartridge from the cell, a first moving mechanism configured to move the accessor mechanism in a first direction, a second moving mechanism configured to move the accessor mechanism in a second direction different from the first direction, an image taking section configured to be provided on the accessor mechanism and detect a position of a mark provided near the cell, and a control section configured to control the first moving mechanism, the second moving mechanism and the image taking section. The stop position adjusting method includes: the image taking section, when a jig having an adjustment mark is attached in the accessor mechanism, detecting a first position of the adjustment mark; the image taking section, when the first moving mechanism and the second moving mechanism move the accessor mechanism based on a predetermined stored stop position information, detecting a second position of the mark provided near the cell; and the control section calculating the misalignment between the first position and the second position, and adjusting the stop position based on the misalignment.

According to another exemplary aspect of the present invention, a computer-readable medium including a computer program includes codes operable to control a computer. Here, the computer program is for a stop position adjusting method executed by a stop position adjusting device for an accessor mechanism in an information recording device using a recording cartridge. The stop position adjusting device includes: the accessor mechanism configured to insert the recording cartridge into a cell and take out the recording cartridge from the cell, a first moving mechanism configured to move the accessor mechanism in a first direction, a second moving mechanism configured to move the accessor mechanism in a second direction different from the first direction, an image taking section configured to be provided on the accessor mechanism and detect a position of a mark provided near the cell, and a control section configured to control the first moving mechanism, the second moving mechanism and the image taking section. The codes of computer program includes: when a jig having an adjustment mark is attached in the accessor mechanism, the control section obtaining a first position of the adjustment mark, which is detected by the image taking section; when the first moving mechanism and the second moving mechanism move the accessor mechanism based on a predetermined stored stop position information, the control section obtaining a second position of the mark provided near the cell, which is detected by the image taking section; the control section calculating the misalignment between the first position and the second position, and adjusting the stop position based on the misalignment; and the control section controlling the first moving mechanism and the second moving mechanism so as to move the accessor mechanism to the adjusted stop position.

BRIEF DESCRIPTION OF THE DRAWINGS

The above and other objects, advantages and features of the present invention will be more apparent from the following description of certain exemplary embodiments taken in conjunction with the accompanying drawings, in which.

EXEMPLARY EMBODIMENTS

A stop position adjusting device and stop position adjusting method for an accessor mechanism in an exemplary embodiment according to the present invention will be described with reference to attached drawings.

Figure 1:
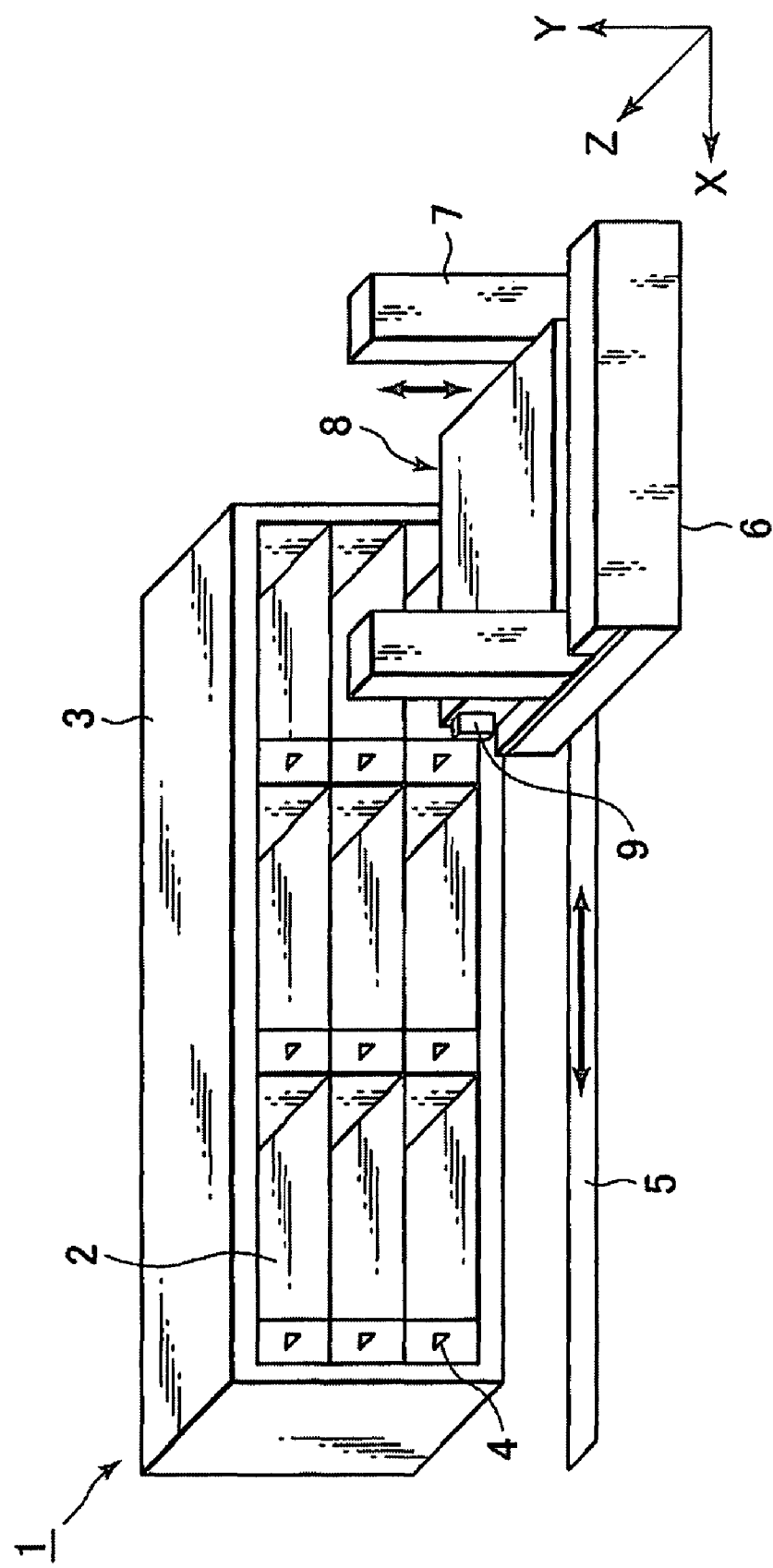
FIG. 1 is an overall view showing a structure example of a magnetic tape unit in an exemplary embodiment according to the present invention.

FIG. 1 is an overall view showing a structure example of a magnetic tape unit in an exemplary embodiment according to the present invention. A magnetic tape unit 1 includes a magazine 3, target marks 4, an X-direction moving mechanism 5, and an accessor mechanism 6. The magazine 3 includes a plurality of cells 2 arranged lengthwise and crosswise in a matrix form. Each target mark 4 is provided on each of the plurality of cells 2, e.g., near a left-side (+x side) edge of an opening of each cell 2. The X-direction moving mechanism 5 moves the accessor mechanism 6 in an X direction. The X-direction moving mechanism 5 may be included in the accessor mechanism 6. The accessor mechanism 6 includes a Y-direction moving mechanism 7, a hand 8, and a camera 9.

The Y-direction moving mechanism 7 moves the hand 8 in a Y direction. The hand 8 includes a cartridge space and a cartridge mechanism. The cartridge space holds and stores a cartridge. The cartridge mechanism takes out the cartridge from the cell 2 (cartridge space) or a tape drive (not shown), and inserts the cartridge into the cell 2 or the tape drive. The camera 9 is provided on a surface of the hand 8, e.g., near a left-side (+x side) edge of an opening of the cartridge space in the hand 8. The camera 9 takes an image of the target mark 4 facing the camera 9. The Y-direction moving mechanism 7 and/or the camera 9 may be provided without including the accessor mechanism 6.

Figure 2:
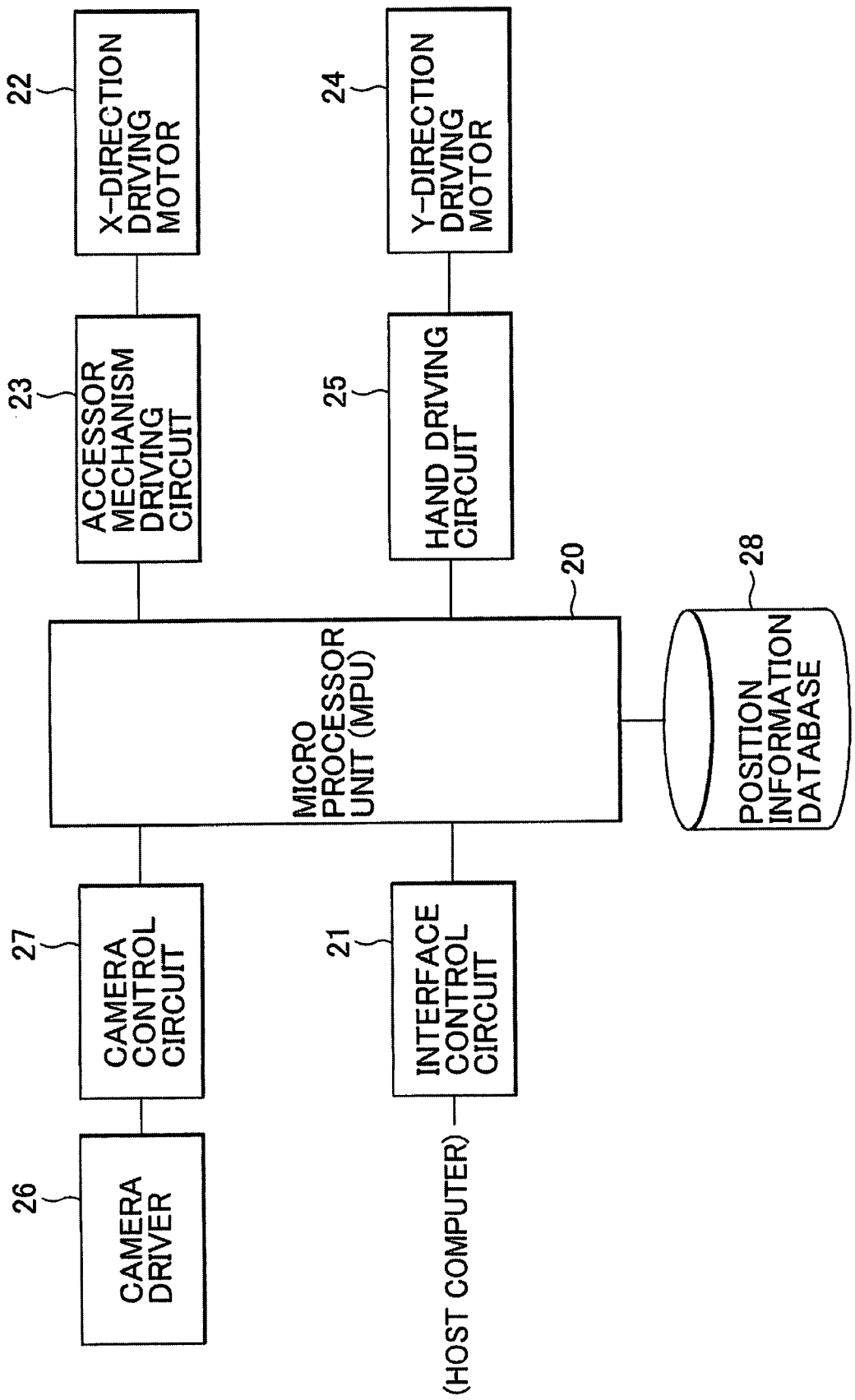
FIG. 2 is a view showing a configuration example of hardware of a stop position adjusting device in the exemplary embodiment according to the present invention.

FIG. 2 is a view showing a configuration example of hardware of a stop position adjusting device in the exemplary embodiment according to the present invention. This hardware relates to control an operation of the accessor mechanism 6. The hardware includes a micro processor unit (MPU) 20, an interface control circuit 21, an accessor mechanism driving circuit 23, an X-direction driving motor 22, a hand driving circuit 25, a Y-direction driving motor 24, a camera control circuit 27, a camera driver 26, and a position information database (DB) 28.

The micro processor unit (MPU) 20 is connected to a host computer, a higher control unit (not shown), via an interface control circuit 21. The MPU 20 executes various programs, which may be stored in a computer-readable medium, to obtain calculation results. The MPU 20 uses information in the position information database (DB) 28 in some cases. Then, the MPU 20 supplies calculation results, by using electric signals, to the accessor mechanism driving circuit 23, the hand driving circuit 25, and the camera control circuit 27, to control these circuits. The accessor mechanism driving circuit 23 controls an X-direction driving motor 22 of the X-direction moving mechanism 5 for moving the accessor mechanism 6 in the X direction. The hand driving circuit 25 controls a Y-direction driving motor 24 of the Y-direction moving mechanism 7 for moving the hand 8 in the Y direction. The camera control circuit 27 controls a camera driver 26 for operating the camera 9. In addition, information related to stop positions of the accessor mechanism 6 with respect to the plurality of cells 2 is stored in the position information database (DB) 28.

Figure 3:
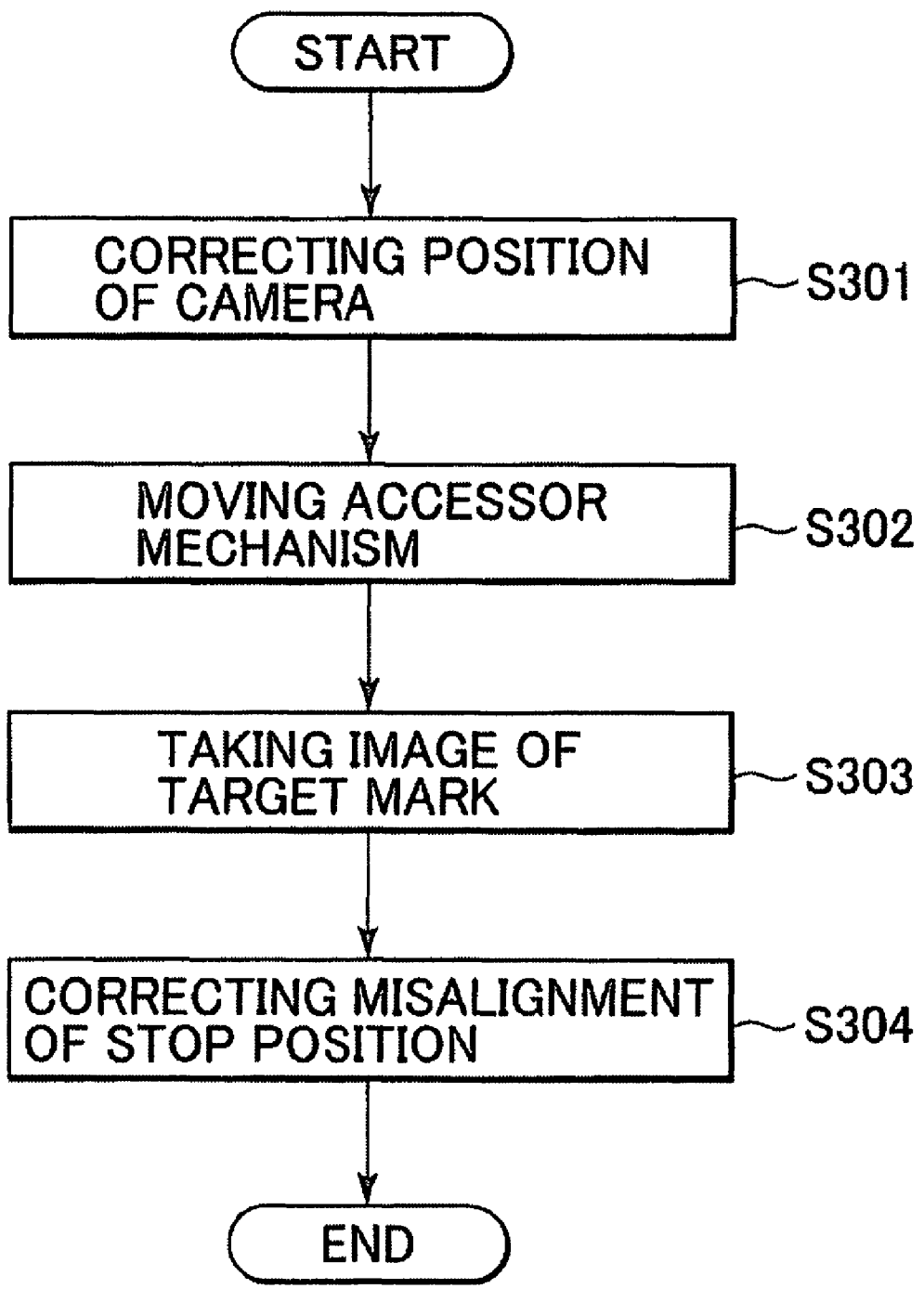
FIG. 3 is a flowchart showing an operation of a method of adjusting a stop position for an accessor mechanism in the exemplary embodiment according to the present invention.

FIG. 3 is a flowchart showing an operation of a method of adjusting a stop position for an accessor mechanism in the exemplary embodiment according to the present invention.

Firstly, a position of the camera 9 is corrected at a step S301. Here, an assembly accuracy of the camera 9 with respect to the hand 8 is corrected. Contents actually performed in the corrections include: an inspection of a camera attaching position to the hand 8; and a correction of a camera origin position.

The former (inspection of the camera attaching position) requires, as conditions, that a bar-code of an 80 mm-width in a horizontal direction can be framed in a camera's angle of view and that a camera rotation angle is within an angle of 2.5°. Here, the bar-code is placed at a position where the target mark 4 will be placed when the accessor mechanism 6 is normally used.

Figure 4A:
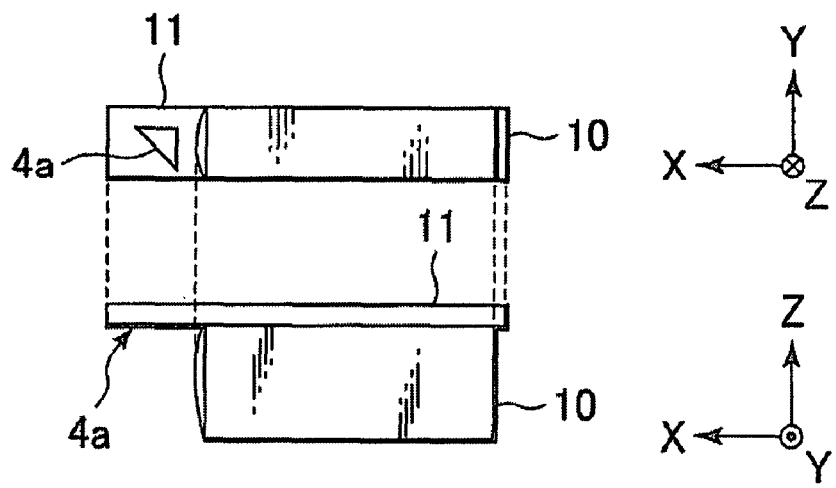
FIG. 4A is a set of a plan and side views showing a structure of a jig used for compensating a camera origin position in the exemplary embodiment according to the present invention.

Subsequently, the latter (correction of a camera origin position) is carried out using a jig 10. FIG. 4A is a set of front and top views showing a structure of the jig used for compensating a camera origin position in the exemplary embodiment according to the present invention. The jig 10 has a box shape with a plate portion 11 on one side surface of the box portion. The plate portion 11 has a target mark 4a, which is identical to the mark 4 of FIG. 1 provided on or near each cell, on a portion protruded from the box portion.

Figure 4B:
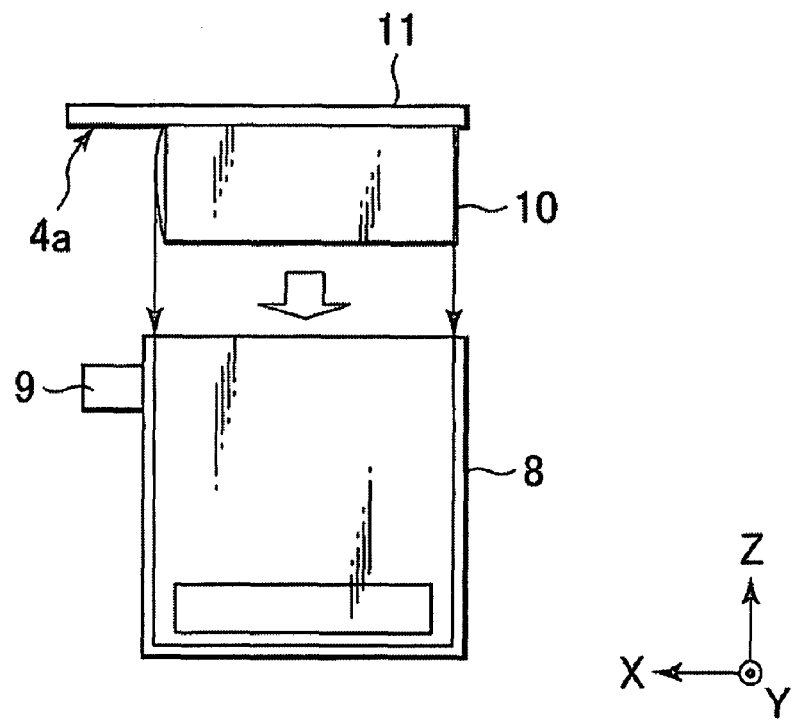
FIG. 4B is a view explaining a method of compensating the camera origin position by using the jig in the exemplary embodiment according to the present invention.

FIG. 4B is a view explaining a method of compensating the camera origin position by using the jig in the exemplary embodiment according to the present invention. The jig 10 is attached in the hand 8. That is, the box portion of the jig 10 fits in the cartridge space of the hand 8. In this situation, the target mark 4a faces the camera 9. Then, the camera 9 takes an image of the target mark 4a. By using this image, the camera origin position will be corrected.

Specifically, the target mark 4a in the jig 10 is attached to a position where the hand 8 will be able to smoothly insert and draw the cartridge (not show) into and from the cell 2. Therefore, a position of an origin of the target mark 4a in the image is calculated and stored in a storage region of the camera control circuit 27 as origin position information. A calculation method of this origin will be explained later in detail.

Next, at a step S302, the accessor mechanism 6 is moved after the jig is drawn from the cell 2. The accessor mechanism 6 is moved to a predetermined position and stopped at the position on the basis of stop position information of each cell 2 preliminarily stored in the position information DB 28.

Then, at a step S303, the camera 9 takes an image of the target mark 4 attached to the target cell 2 on the magazine 3. Then, a position of an origin of the target mark 4 in this image is calculated.

Furthermore, at a step S304, a misalignment of the stop position of the accessor mechanism 6 is calculated based on a difference between the position of the target mark 4 obtained at step S303 and the position of the origin of the target mark 4a obtained at step S301. Then, the misalignment is stored in the position information DB 28. Here, the misalignment includes, for example, a misalignment distance and a misalignment direction, or a misalignment coordinates difference ($\pm \Delta X$, $\pm \Delta Y$). The stop position of the accessor mechanism 6 after the process of these adjustments is determined on the basis of the misalignment stored in the position information DB 28. That is, the stop position is a position where the calculated misalignment and the position of the stop position information preliminarily stored are added.

Figure 5:
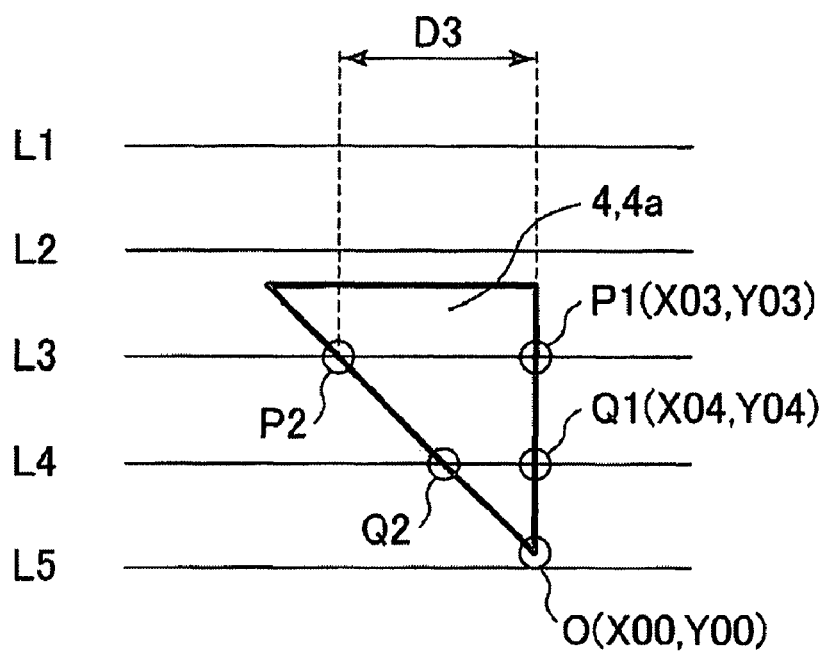
FIG. 5 is a view showing a relationship between scanning lines of a camera and a target mark in the exemplary embodiment according to the present invention.

Next, the calculation method of the origin will be explained. FIG. 5 is a view showing a relationship between scanning lines of a camera and a target mark in the exemplary embodiment according to the present invention. When the camera 9 captures the target mark 4 that is a subject, a plurality of the scanning lines traverses the target mark 4. In this figure, it is assumed that five scanning lines L1, L2, L3, L4, and L5 exists as the plurality of scanning lines. Intersection points P1 and Q1 where the scanning lines L3 and L4 intersect the target mark 4 are obtained as obtained coordinates P1(X03, Y03) and Q1(X04, Y04). Here, two scanning lines L3 and L4 intersect the target mark 4. If the intersect points are less than two, the camera 9 has to be adjusted to narrow intervals of the scanning lines so that two scanning lines intersect the target mark 4.

Next, as for the calculation of coordinates of the origin O (X00, Y00), when a difference between X03 and X04 is zero (0), X03 (or X04) is a value of X00. However, when the difference is equal to a certain threshold value or more, it shows that the camera 9 is inclined. In this case, the camera 9 has to be readjusted.

Furthermore, as for a value of Y00, the value can be obtained on the basis of a distance D3 and Y03. Here, the distance D3 is a distance between the intersection point P1 and an intersection point P2 other than the intersection point P1 where the scanning line L3 intersects with the target mark 4. This is because the target mark 4 is in a equilateral triangle shape. That is, in FIG. 5, a position vertically lowered by the distance D3 from the intersection point P1 is the origin point O. Therefore, the value of Y00 can be obtained by subtracting the distance D3 from Y03. Obviously, the value of Y00 can be obtained in the similar manner on the basis of the coordinates Q1(X04, Y04) and a distance between the intersection point Q1 and another intersection point Q2 where the scanning line L4 intersects with the target mark 4.

As described above, since the camera 9 is set to thin out the scanning lines and spread the intervals therebetween so that the entire target mark 4 can be captured by the scanning lines and the origin of the target mark 4 is calculated on the basis of several intersection points of the target mark 4 with the scanning lines, hardware for advanced image processing is not needed and additionally the calculation of the origin can be processed in a very short time.

According to the present invention, since a mechanism on a magazine side, which adjusts a stop position for the accessor mechanism, is simply realized by adding marks, an effect of realizing a compact structure of the magnetic tape unit can be obtained.

In addition, according to the present invention, an effect of adjusting the stop position for the accessor mechanism in a short time can be obtained.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. A stop position adjusting device for an accessor mechanism in an information recording device using a recording cartridge, comprising:
    said accessor mechanism configured to insert said recording cartridge into a cell and take out said recording cartridge from said cell;
    a first moving mechanism configured to move said accessor mechanism in a first direction;
    a second moving mechanism configured to move said accessor mechanism in a second direction different from said first direction; and
    an image taking section configured to be provided on said accessor mechanism and detect a position of a mark provided near said cell;
    wherein an adjustment of a stop position of said accessor mechanism for said cell is executed based on said position detected by said image taking section,
    wherein when a jig having an adjustment market is attached in said accessor mechanism, said image taking section detects a first position of said adjustment mark,
    wherein when said first moving mechanism and said second moving mechanism move said accessor mechanism based on a predetermined stored stop position information, said image taking section detects a second position of said mark provided near the cell after the jig is detached from said accessor, and
    wherein said adjustment of said stop position is executed based on a misalignment between said first position and said second position.

2. The stop position adjusting device according to claim 1, further comprising:

a control section configured to control said first moving mechanism, said second moving mechanism and said image taking section, and wherein said control section calculates said misalignment based on said first position and said second position, and adjusts said stop position based on said misalignment.

3. An information recording device using a recording cartridge, comprising:

a magazine configured to include a cell storing said recording cartridge; and a stop position adjusting device for an accessor mechanism, wherein said stop position adjusting device includes:

said accessor mechanism configured to insert said recording cartridge into said cell and take out said recording cartridge from said cell, a first moving mechanism configured to move said accessor mechanism in a first direction, a second moving mechanism configured to move said accessor mechanism in a second direction different from said first direction, and an image taking section configured to be provided on said accessor mechanism and detect a position of a mark provided near said cell, wherein an adjustment of a stop position of said accessor mechanism for said cell is executed based on said position detected by said image taking section, wherein when a jig having an adjustment mark is attached in said accessor mechanism, said image taking section detects a first position of said adjustment mark, wherein when said first moving mechanism and said second moving mechanism move said accessor mechanism based on a predetermined stored stop position information, said image taking section detects a second position of said mark provided near the cell after the jig is detached from said accessor, and wherein said adjustment of said stop position is executed based on a misalignment between said first position and said second position.

4. The information recording device according to claim 3, wherein said stop position adjusting device further includes:

a control section configured to control said first moving mechanism, said second moving mechanism and said image taking section, and wherein said control section calculates said misalignment based on said first position and said second position, and adjusts said stop position based on said misalignment.

5. A stop position adjusting method executed by a stop position adjusting device for an accessor mechanism in an information recording device using a recording cartridge, wherein said stop position adjusting device includes:

said accessor mechanism configured to insert said recording cartridge into a cell and take out said recording cartridge from said cell, a first moving mechanism configured to move said accessor mechanism in a first direction, a second moving mechanism configured to move said accessor mechanism in a second direction different from said first direction, an image taking section configured to be provided on said accessor mechanism and detect a position of a mark provided near said cell, and a control section configured to control said first moving mechanism, said second moving mechanism and said image taking section, said stop position adjusting method comprising: said image taking section, when a jig having an adjustment mark is attached in said accessor mechanism, detecting a first position of said adjustment mark;

said image taking section, when said first moving mechanism and said second moving mechanism move said accessor mechanism based on a predetermined stored stop position information, detecting a second position of said mark provided near the cell; and said control section calculating said misalignment between said first position and said second position, and adjusting said stop position based on said misalignment.

6. A non-transitory computer-readable medium storing computer program, the computer program executable by a stop position adjusting device for an accessor mechanism in an information recording device using a recording cartridge, execution of the computer program resulting a stop position method being performed, the stop position method comprising:

causing said accessor mechanism of said stop position adjusting device insert said recording cartridge into a cell and take out said recording cartridge from said cell;

causing a first moving mechanism of said stop position adjusting device configured to move said accessor mechanism in a first direction;

causing a second moving mechanism of said stop position adjusting device configured to move said accessor mechanism in a second direction different from said first direction;

causing an image taking section of said stop position adjusting device configured to be provided on said accessor mechanism and detect a position of a mark provided near said cell; and causing a control section of said stop position adjusting device configured to control said first moving mechanism, said second moving mechanism and said image taking section;

causing, when a jig having an adjustment mark is attached in said accessor mechanism, said control section to obtain a first position of said adjustment mark, which is detected by said image taking section;

causing, when said first moving mechanism and said second moving mechanism move said accessor mechanism based on a predetermined stored stop position information, said control section to obtain a second position of said mark provided near the cell, which is detected by said image taking section;

causing said control section to calculate said misalignment between said first position and said second position, and to adjust said stop position based on said misalignment; and causing said control section to control said first moving mechanism and said second moving mechanism so as to move said accessor mechanism to said adjusted stop position.

* * * * *